(12) United States Patent
Gingras

(10) Patent No.: US 9,115,848 B1
(45) Date of Patent: Aug. 25, 2015

(54) EMERGENCY SAFETY SWITCH

(75) Inventor: Stephen John Gingras, Elk River, MN (US)

(73) Assignee: WESCO Distribution, Inc., Pittsburgh, PA (US)

( * ) Notice: Subject to any disclaimer, the term of this patent is extended or adjusted under 35 U.S.C. 154(b) by 722 days.

(21) Appl. No.: 13/540,668

(22) Filed: Jul. 3, 2012

(51) Int. Cl.
*H02H 11/00* (2006.01)
*F16P 7/00* (2006.01)

(52) U.S. Cl.
CPC .................................... *F16P 7/00* (2013.01)

(58) Field of Classification Search
USPC ......................................................... 307/326
See application file for complete search history.

(56) References Cited

U.S. PATENT DOCUMENTS

| 4,659,909 A * | 4/1987 | Knutson ..................... 219/446.1 |
| 6,396,172 B1 * | 5/2002 | Couture ......................... 307/125 |
| 7,157,812 B2 * | 1/2007 | Couture ........................... 307/98 |

OTHER PUBLICATIONS

"SensaGuard Switches & an E-Stop Switch Wired to an MSR127RP Safety Relay", by Rockwell Automation (dated Mar. 24, 2004—pp. 1 through 4).
"Machine Safety Emergency Stop & Stop Control", by Banner Engineering Corp. (Minneapolis, MN) (dated Nov. 2008—5 pages).

\* cited by examiner

*Primary Examiner* — Rexford Barnie
*Assistant Examiner* — Dru Parries
(74) *Attorney, Agent, or Firm* — Renner, Kenner, Greive, Bobak, Taylor & Weber

(57) ABSTRACT

An emergency safety switch for a safety control system used to terminate the operation of one or more automated machines includes a stop circuit that is electrically connected to a connection port. The connection port includes a pair of interface ports for in-line serial connection to a wiring circuit provided by the safety control system to monitor various emergency safety switch and other detection devices. As such, the connection port provides a quick and easy manner for attaching and detaching the emergency safety switch to the wiring circuit, which facilitates efforts to install a sufficient number of emergency stop switches on an automated production line.

4 Claims, 1 Drawing Sheet

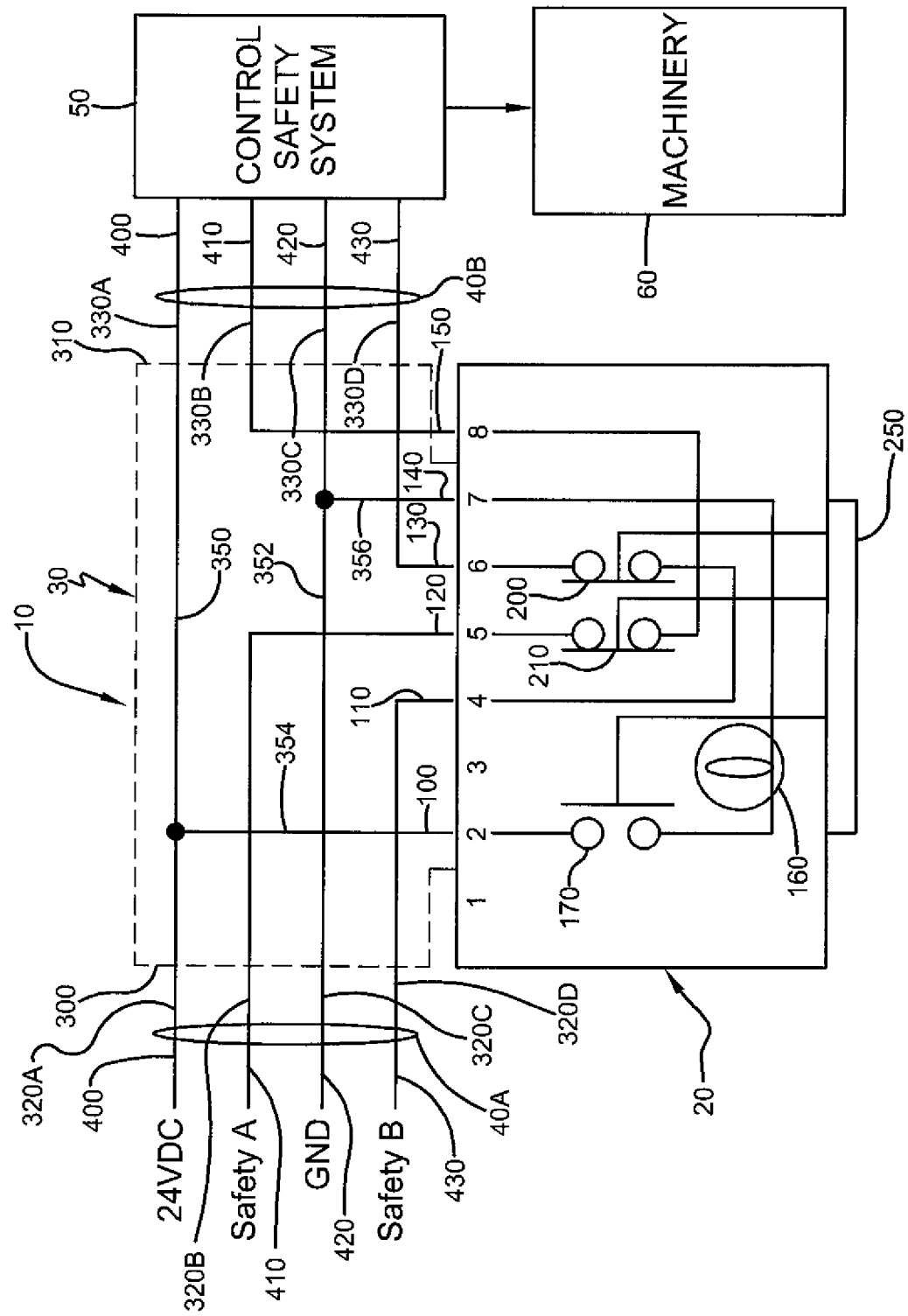

EMERGENCY SAFETY SWITCH

TECHNICAL FIELD

The present invention relates generally to an emergency safety switch for automated machinery. More particularly, the present invention relates to an emergency safety switch configured for use with existing safety circuit wiring provided by a safety control system. More specifically, the present invention relates to an emergency safety switch having a connection port to facilitate the attachment of the emergency safety switch to existing safety circuit wiring provided by a safety control system.

BACKGROUND ART

Emergency safety switches, emergency stops, or E-stops are typically part of a comprehensive safety control system that is utilized to supervise the operation of automated production systems, such as those used, for example, for automated manufacturing. Specifically, the safety control system is in communication with one or more emergency safety switches and with various pieces of automated machinery that is part of the automated production line. In response to the actuation of the emergency safety switch to indicate that an unsafe event has occurred or is about to occur, the safety control system stops or terminates the operation of the automated machinery in order to prevent the occurrence of injury to workers, the machinery, or to the articles being handled by the machinery. Thus, emergency safety switches or E-stops are provided as manually-actuated switches, which are actuated by a worker when he or she identifies or anticipates an unsafe condition and needs to stop the automated movement of the production line machinery.

Current emergency stop switches or E-stop switches are required to be hardwired into the safety circuit wiring of the safety control system, which requires substantial time and effort to carry out. In the case of existing safety control systems that utilize proprietary wiring configurations, it can take an inexperienced technician a significant amount of time and effort to understand the wiring logic of such wiring configurations in order to correctly attach the emergency safety switch or E-stop to the safety system wiring. Such drawbacks may result in the lack of a sufficient number of emergency safety switches or E-stops being installed along the automated production line or, in some cases, the complete lack of the installation of any emergency safety switches altogether.

Therefore, there is a need for an emergency safety switch, or E-stop, that is configured to be easily retrofit or attached to the wiring of an existing safety control system for the machinery of an automated production line or process. In addition, there is a need for an emergency safety switch, or E-stop, that is low cost.

SUMMARY OF INVENTION

It is thus an object of one aspect of the present invention to provide an emergency safety switch that can easily be coupled to a safety control system for machinery in a production line.

It is an object of another aspect of the present invention to provide an emergency safety switch, as above, that can economically be retrofit to existing safety control systems.

These and other objects of the present invention, as well as the advantages thereof over existing prior art forms, which will become apparent from the description to follow, are accomplished by the improvements hereinafter described and claimed.

In general, an emergency safety switch configured to be coupled to a wiring circuit of a safety control system used to terminate the operation of one or more automated machines coupled thereto includes a first path having a first control switch. The emergency safety switch also includes a second path having a second control switch, and a main switch that is in operative communication with the first and second control switches. A first and second connection interface is adapted to be coupled in series with the wiring circuit of the safety control system. Each connection interface has at least four terminals, such that the first and third terminals of the first and second connection interfaces are coupled together by respective first and second bridge lines. As such, the first path is coupled between the fourth terminals of the first and second connection interfaces, and the second path is coupled between the second terminals of the first and second connection interfaces. Thus, when the main switch is actuated, the control switches are moved from a normally closed state to an open state.

A preferred exemplary emergency safety switch for a safety control system made according to the concepts of the present invention is shown by way of example in the accompanying drawing without attempting to show all the various forms and modifications in which the invention might be embodied, the invention being measured by the appended claims and not by the details of the specification.

BRIEF DESCRIPTION OF THE DRAWING

FIG. 1 is a schematic view of an emergency safety switch, or E-stop switch, in accordance with the concepts of the present invention.

DETAILED DESCRIPTION OF THE INVENTION

An emergency safety switch is generally referred to by the numeral 10 in the drawing. It should be appreciated, that the term "emergency safety switch" may be used herein interchangeably with the terms "E-stop" and "emergency stop switch". Specifically, the emergency safety switch 10 includes a stop circuit 20 that is operatively coupled to a connection port 30 that allows the stop circuit 20 to be attached to a wiring circuit or harness 40 that is coupled to a safety control system 50 that monitors the operational status of the switch 10. The safety control system 50 is configured to be coupled to various automated machinery 60 that is part of an automated production line, process, or manufacturing line. As such, the actuation of the emergency stop switch 10 causes the safety control system 50 to responsively stop the operation of the machinery 60 to which it is coupled.

Stop circuit 20 of the emergency safety switch 10 includes electrical connection terminals 100, 110, 120, 130, 140, and 150. Coupled between terminals 100 and 140 are a series of coupled light elements 160 and light switches 170, which form a first path. It should be appreciated that the light element 160 may comprise any suitable illumination element, such as an LED (light emitting diode), or incandescent light for example. Coupled between terminals 110 and 130 is a control switch 200, which forms a second path, and coupled between terminals 120 and 150 is a control switch 210, which forms a third path. In one aspect, the light and control switches 170, 200, 210 may comprise push-button type switches that are configured to be moved between an ON and OFF position or state, such that the light switch 170 is normally in an OFF state or open position, while the control switches 200, 210 are normally in an ON state or closed position. In addition, the movement of the light switch 170 and control switches 200, 210 from their normal resting position or state is controlled by a main switch or actuator 250 that is operatively attached to the switches 170, 200, 210. It should be appreciated that the actuator 250 and switches 170, 200, 210 are configured as maintained switches that are configured to remain in either a normal resting state or an active state, and are only moved from one state or the other upon the manual actuation of the actuator 250 by the user. For example, when the actuator 250 is configured as a push button and is depressed from its normal resting state, the actuator 250 and the switches 170, 200, 210 are moved to an active state where they remain until the actuator 250 is manually actuated again by the user, such as by pulling or twisting the actuator 250, which results in the actuator and switches 170, 200, 210 returning to their normal resting state.

As such, during operation of the emergency safety switch 10, when the actuator 250 is depressed by the user's hand, the light switch 170 and control switches 200, 210 are moved to their active position or state where they maintained. As a result, the light switch 170 is moved to an ON or closed position, and the control switches 200, 210 are moved to an OFF or open position. If it is desired to return the actuator 250 and switches 170, 200, 210 to the normal resting state then the actuator 250 is manually moved back to its normal resting state by pulling or twisting the actuator 250 backward. As a result, the actuator 250 and switches 170, 200, 210 are moved back to their normal resting state where they are maintained.

The connection port 30 includes interfaces 300 and 310 that allow the emergency safety switch 10 to be readily coupled in-line or in series with the wiring harness or circuit 40. In one aspect, the connection interfaces 300 and 310 may be configured as threaded or quick-disconnect connectors that are compatible with counterpart connectors provided by the wiring harness or circuit 40. Each interface 300 and 310 includes four interface terminals 320A-D and 330A-D, respectively. Terminals 320A and 320C of interface 300 are respectively coupled to terminal 330A and terminal 330C of interface 310 by respective wires or bridge lines 350 and 352. Furthermore, interface terminals 320A and 330A of interfaces 300 and 310 are coupled to terminal 100 of the stop circuit 20 via wire 354, while interface terminals 320C and 330C of interfaces 300 and 310 are coupled to terminal 140 via wire 356. In addition, interface terminals 320B and 320D of interface 300 are respectively coupled to terminals 120 and 110 of the stop circuit 20, while interface terminals 330B and 330D of interface 310 are respectively coupled to terminals 150 and 130 of the stop circuit 20. It should also be appreciated that the stop circuit 20 and connection port 30 may be carried by any suitable housing.

The emergency safety switch 10 is configured to be coupled in-line with the wiring circuit or harness 40, which includes four conductive lines or wires: a power wire 400; a safety control A wire or line 410; a ground (GND) wire 420; and a safety control B wire or line 430. In one aspect, the power and ground (GND) wires or lines 400 and 420 may be coupled to any suitable power source, including a 24 VDC power source for example. The safety control wire A 410 and safety control wire B 430 are configured to communicate with the safety control system 50 that is configured to be interfaced with various machinery 60 that is part of the production line being monitored.

Thus, to place the emergency safety switch 10 into operation, the connection port 30 is attached in-line or in series with each end of the wiring circuit 40, denoted as 40A and 40B, provided by the safety control system 50, such that interface 300 is attached to end 40A of the wiring 40 and interface 310 is attached to end 40B of the wiring 40. Once the emergency stop switch 10 is connected to the safety control system 50, the light switch 170 is maintained in a normally open or OFF position, while the control switches 210 and 220 are both maintained in a normally closed or ON position. Upon depressing or otherwise actuating the main switch 250 by the user to identify an adverse event, such as the malfunction of the machinery 60, the light and control switches 170, 200, 210 are placed in their active position, such that the light switch 170 is closed and the control switches 200, 210 are opened. As a result, the light element 160 is illuminated to indicate that the emergency safety switch 10 was actuated, while the safety A and safety B control lines 410 and 430 of the wiring circuit 40 are placed in an open circuit state. Specifically, the safety control system 50 interprets the open circuit state of the control lines 410, 430 as an adverse event, and correspondingly takes corrective action by shutting down or terminating the operation of the necessary machinery 60 to prevent the furtherance of damage to such machines and/or to prevent injury to persons in the vicinity.

It will, therefore, be appreciated that one advantage of one or more embodiments of the present invention is that an emergency safety switch that provides a connection port is configured to be readily and quickly attached to a wiring circuit provided by a safety control system. Another advantage of the present invention is that the emergency safety switch is configured to be connected to emergency control lines provided by the wiring circuit of a safety control system used to shut down automated machinery in the event of an adverse event. Still another advantage of the present invention is that the emergency safety switch provides a light element to identify that the emergency safety switch has been actuated.

Thus, it can be seen that the objects of the present invention have been satisfied by the structure and its method for use presented above.

What is claimed is:

1. An emergency safety switch configured to be coupled to a wiring circuit of a safety control system used to terminate the operation of one or more automated machines coupled thereto, the emergency safety switch comprising:
a first path having a first control switch;
a second path having a second control switch;
a main switch in operative communication with said first and second control switches; and
a first and second connection interface adapted to be coupled in series with the wiring circuit of the safety control system, each said connection interface having at least four terminals, such that said first and third terminals of each said first and second connection interfaces are coupled together by respective first and second bridge lines, such that said first path is coupled between said fourth terminals of said first and second connection interfaces, and said second path is coupled between said second terminals of said first and second connection interfaces, a third path including a light switch in series with a light, said light switch in operative communication with said main switch, said third path being coupled between the first bridge line and said second bridge line, wherein when said main switch is actuated, said light switch is moved from a normally open state to a closed state;
wherein when said main switch is actuated, said control switches are moved from a normally closed state to an open state.

2. The emergency safety switch of claim 1, wherein said light comprises a light emitting diode (LED).

3. The emergency safety switch of claim 1, wherein said first, second, and third paths, said main switch, and said first and second connection interfaces are carried by a housing.

4. The emergency safety switch of claim 1, wherein said first and second connection interfaces each include a quick-disconnect port.

\* \* \* \* \*